Oct. 11, 1932.  J. F. JAWOROWSKI  1,882,632

METER

Filed Sept. 3, 1930  2 Sheets-Sheet 1

INVENTOR
J. F. JAWOROWSKI
BY Fisher, Moser & Moore
ATTORNEYS.

Oct. 11, 1932.  J. F. JAWOROWSKI  1,882,632
METER
Filed Sept. 3, 1930   2 Sheets-Sheet 2

INVENTOR
JOSEPH F. JAWOROWSKI
BY
Fisher, Moser & Moore
ATTORNEY

Patented Oct. 11, 1932

1,882,632

UNITED STATES PATENT OFFICE

JOSEPH F. JAWOROWSKI, OF CLEVELAND, OHIO

METER

Application filed September 3, 1930. Serial No. 479,483.

My invention relates to meters, especially piston meters or positive displacement meters for measuring liquids flowing through pipes, for example, gasoline or oil, which is being dispensed or transferred by a pump, and in general my object is to provide an efficient meter of simple design, and relatively low cost in which a plurality of measuring cylinders and reciprocable pistons are combined with a single rotatable member adapted to control the reciprocable movements of the pistons and the flow of the liquid into and out of the measuring cylinders as hereinafter more fully described and claimed.

Figure 1:
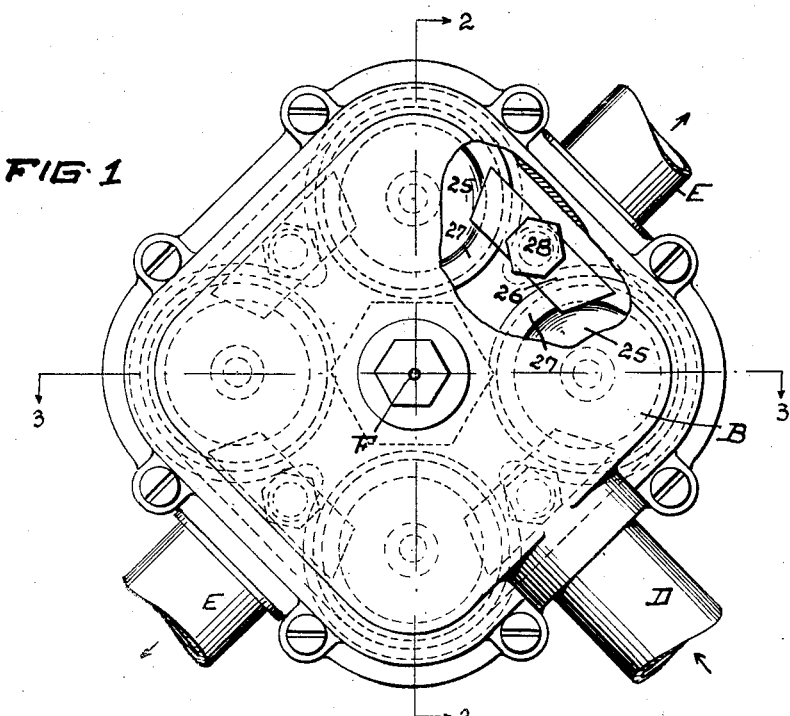
Figure 2:
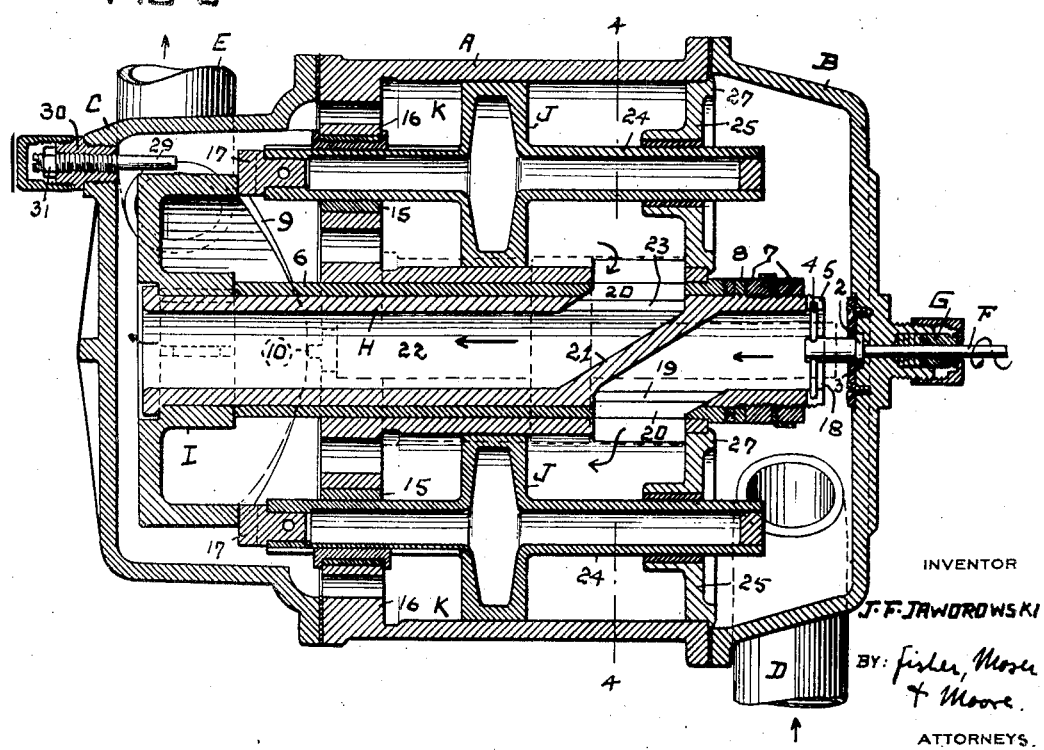
Figure 3:
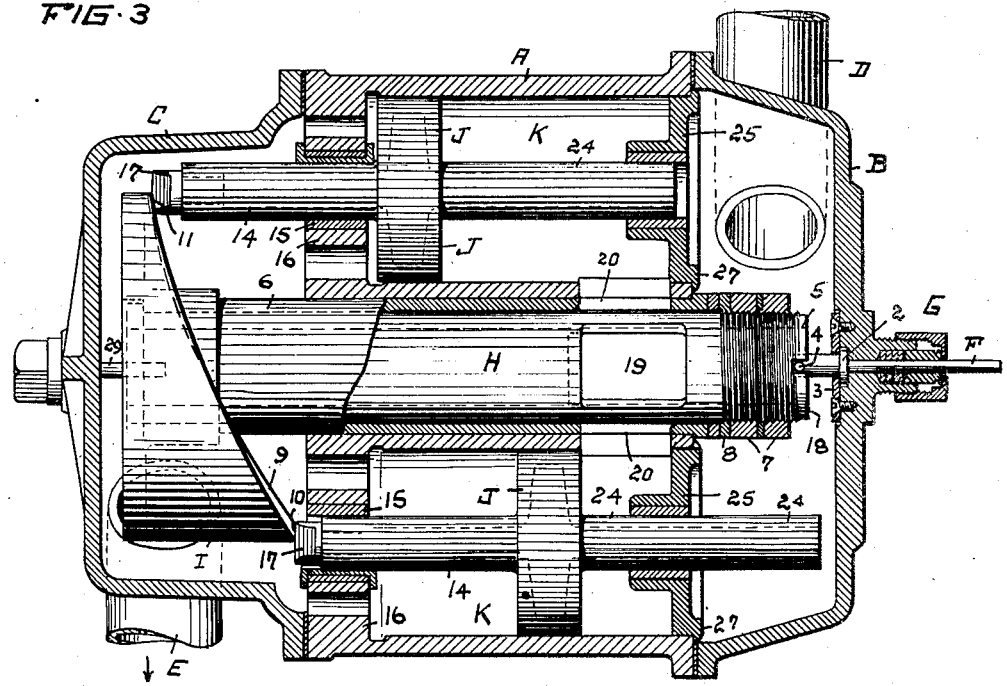
Figure 4:
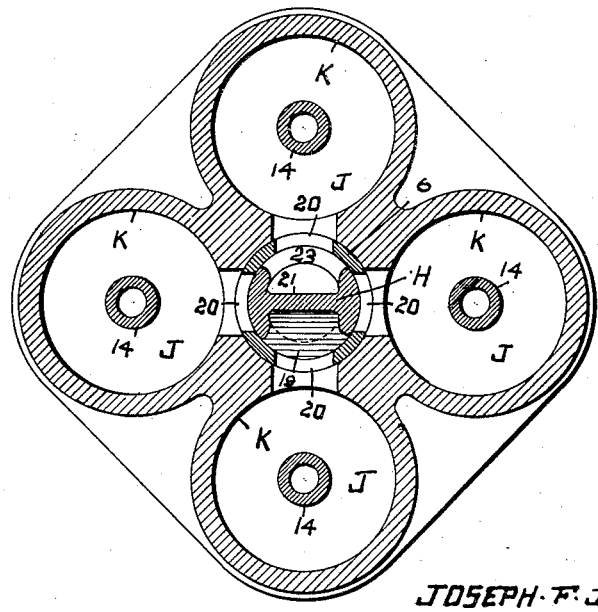

In the accompanying drawings, Fig. 1 is an end view of the meter, with a portion broken away to disclose an interior part. Fig. 2 is a longitudinal sectional view of the meter on line 2—2 of Fig. 1, and Fig. 3 is a similar sectional view longitudinally of the meter but in another plane on line 3—3 of Fig. 1. Fig. 4 is a cross section of the meter on line 4—4 of Fig. 2.

The meter comprises a main body A having dished heads or chambered covers B and C, respectively, removably affixed to opposite ends thereof. To install the meter, an intake pipe D is connected to head BB, and one or more discharge pipes E are connected to head C.

The meter may be installed in either a vertical or horizontal position, and when so installed any suitable registering means or recording device (not shown) is connected to a rotatable stem or shaft F which extends through a packing gland G centrally of head or cover B.

Stem or shaft F is held against axial movement by a collar 2 which is engaged by a plate 3 screwed to the inner side of head B, and when head B is attached to body A, a cross pin 4 at the inner end of stem F is adapted to interlock with the notched end 5 of a driving member H therefor. Member H is a cylindrical shaft or tube having rotatable bearing within a sleeve or bushing 6 fixed tightly within an axial opening in body A, and screw nuts 7 at the outer end of member H hold a thrust washer or ring 8 against the outer end of sleeve 6. The opposite end of member H extends into head C, and a cam wheel I is keyed thereto against the corresponding end of sleeve 6. An annular cam surface 9 is provided on wheel I, and the high and low places 10 and 11, respectively, of the cam are diametrically related on opposite sides of said axis. Any desired degree of inclination or slope of cam surface 9 may be adopted to effect rotation of cam wheel I by and through the movement of a plural number of reciprocable pistons J operating within separate measuring cylinders or chambers K arranged equi-distantly from the axis of member H and radially disposed in respect thereto on parallel lines. In the present meter, four cylinders and pistons are used, each piston J being provided with an axial extension or shaft 14 adapted to slide in a bushing 15 within the perforated end wall 16 of body A, and a thrust member or shoe 17 is fixed to the end of each shaft 14 to engage and ride the inclined cam surface 9 of wheel I. Accordingly, when two of the four pistons are forced to travel toward the cam wheel the said wheel will be rotated, and in rotating will cause the other two pistons to travel in the opposite direction.

In a meter embodying four pistons the cylinders for the pistons are arranged in a circle ninety degrees apart, and when one piston is at the beginning of its working stroke the piston diametrically opposite thereto is at the beginning of its return stroke, as shown in Fig. 3, whereas the other pair of pistons are at the middle of their working and return strokes, respectively, substantially as delineated in Fig. 2.

The reciprocable movements of the pistons and the rotatable movement of the cam wheel are effected by pumping the liquid through one end of the hollow shaft or member H into the measuring cylinders successively.

The flow of the liquid from the interior of head B to each cylinder K is by way of intake passage 18 in the outer end of member H and a port 19 in the side thereof, which port is adapted to register successively with a series of ports 20 extending radially through sleeve 6 and the central part of body A when member H is rotated. A slanting division wall 21 within hollow member H separates the intake passage 18 at its outer end from a discharge passage 22 extending in the opposite direction through member H to its extreme opposite end. A second port 23, hereinafter termed a discharge port, is further provided in the side of hollow member H opposite the slanting division wall 21 and diametrically opposite port 19. Discharge port 23 is therefore also adapted to register successively with the radial ports 20 when member H is rotated, so that the liquid taken into each cylinder may be expelled and dicharged from the series of measuring cylinders K, successively. Such discharge occurs upon the return stroke of each piston, as indicated in Fig. 2 where the piston in the upper cylinder is moving toward port 23, and the piston in the lower cylinder is openly exposed to the pressure side of the meter, and traveling toward cam wheel I, it being understood that operations are dependent upon the existence of differential pressure conditions at the intake and discharge ends of the meter. For example, in a pressure system the pumping pressure may be fifteen pounds at the intake pipe D, and naught to six pounds at the discharge pipe E.

As shown, each piston J is hollow and includes a hollow extension or shaft 24 which is closed at its outer end where it extends through a cover plate 25 for the corresponding cylinder. A solid piston and shaft could be used, but the weight is reduced by making these parts hollow, and preferably, the pistons and their extensions are cast integral of aluminum or other metal of light weight. The cylinder caps or cover plates 25 are also preferably fastened in place against the outer end of body A by separate bars or pieces 26 adapted to span the spaces between the cylinders and to bear at their opposite ends upon the flanged rims 27 of contiguous cover plates 25, a single clamping bolt 28 between the ends of the clamping pieces serving to connect the same to body A, see Fig. 1. Thus, the recessed head B may be removed from body A without detaching the cover plate 25, and any single cover plate 25 may be removed without detaching the remaining cover plates.

A simple adjusting device to closely regulate the measuring operations of the meter is also provided. This device consists of a set screw 29 mounted within a screw plug 30 attached to meter head C, a locking nut 31 being included to secure the set screw tightly in position when adjusted, and the inner end of set screw 29 being adapted to overlap the cam wheel opposite the shoe or thrust member 17 carried by one of the pistons J, thereby permitting the set screw to be adjusted and set to limit the working stroke of that particular piston. In that way the measuring capacity of that particular cylinder may be decreased or increased within limits, and the metering operations regulated or corrected. Similar regulating set screws may be provided for each cylinder, but only one is required when the total amount taken in by the four cylinders is used as a basis for recording or registering purposes, and one complete revolution of member H is effected by the successive transfer operations of the four pistons in said cylinders.

The operation of the meter may be easily deduced from the foregoing description, but recapitulating briefly, when liquid under pressure is permitted to flow through the meter, the liquid passes through the intake end 18 of hollow member H and directed first into one cylinder and then into two cylinders by way of the side port 19 as it revolves past the radial ports in the sleeve. Rotation of member H is produced by the two pistons exposed to the liquid under pressure, and by the pressure of the thrust members for the pistons against the inclined cam surfaces on wheel I from the high to the low points thereon. The rotation imparted to the cam wheel by the two pistons exposed to pressure produces a return or reverse movement of the other pair of pistons, inasmuch as the inclined portions of the cam wheel at that side of the wheel are forcing the thrust members for that pair of pistons in an opposite direction, that is, toward head B. The liquid in the cylinders for the latter pair of pistons is thereby expelled or discharged through the discharge port in hollow member H which operates as a valve as it rotates past the ports in those cylinders. By employing four cylinders, there is always one piston exposed to the full pressure of the liquid and in an operating position so that the cam wheel will be rotated effectively whenever the liquid is caused to flow through the meter and as long as it continues to flow therethrough.

The high and low points on the cam are flattened circumferentially for a short distance to provide a dwell in the movement of the pistons at the beginning of the working stroke, but in this interval of dwell of two pistons valve member H continues to rotate to properly time the opening and closing of the ports for the cylinders containing said two pistons. One of the other two pistons is under pressure during this interval of dwell, and therefore, operating to rotate the cam wheel and valve member H.

What I claim is:

1. In a meter, a main body containing a plurality of measuring chambers parallel to and radially disposed about a common axis, there being a port in the wall of each of said cylinders, a rotatable shaft extending through said body on said axis having separate intake and discharge passages extending longitudinally through said shaft and adapted to register successively with said ports in the wall of said chambers, a cam wheel fixed to said shaft opposite corresponding ends of said measuring chambers, and reciprocable pistons within said chambers and having operating connections with said cam wheel.

2. In a meter, a plurality of measuring cylinders, there being liquid transfer ports in the wall of said cylinders, a reciprocable piston in each cylinder, separate intake and discharge heads at opposite ends of said cylinders, a rotatable shaft having an axial intake passage open to the intake head and a discharge passage open to the discharge head and provided with separate inlet and outlet ports adapted to register with said transfer ports of said measuring cylinders, a cam wheel adapted to rotate said shaft, and said pistons having operating shafts in thrust engagement with said cam wheel.

3. In a meter, a main body having a plurality of measuring chambers radially disposed and parallel in respect to a central axial opening in the body, there being ports connecting each chamber with said opening, dished heads attached to opposite ends of said body and having fluid intake and inlet connections, respectively, a hollow shaft extending through said axial opening having intake and discharge openings communicating with the respective interiors of said dished heads and provided with inlet and discharge ports in its side adapted to register successively with the ports for said measuring chambers, a cam wheel fixed to said shaft, and shafts for said pistons having thrust engagement with said cam wheel.

4. In a meter, a plurality of measuring cylinders radially arranged and parallel to a central axis, there being liquid transfer ports in the walls of said cylinders, reciprocable pistons within said cylinders, a rotatable cam member axially aligned with said axis, a rotatable valve member connected with said cam member and having intake and discharge openings adapted to align with said liquid transfer ports of said cylinders to control the flow of liquid into and out of said measuring cylinders successively, and operating shafts extending from said pistons into riding engagement with said cams to rotate said cam and to reciprocate said pistons.

5. In a meter a plurality of measuring cylinders, there being a fluid transfer opening in the wall of each cylinder, reciprocable pistons within said cylinders, a rotatable cam, a valve member coupled with said cam, there being intake and discharge passages within said valve member adapted to successively register with said fluid transfer openings of said cylinders, coupling means between said pistons and said cam to rotate said cam member by the reciprocable movement of said pistons and adjustable means for limiting in one direction the travel of at least one of said pistons.

6. In a meter, a plurality of measuring cylinders, there being a fluid transfer opening in the wall of each cylinder, reciprocable pistons within said cylinders, a rotatable valve member for controlling the flow of a fluid through said openings and into and from said cylinders successively, a rotatable cam attached to said valve member, coupling means between said pistons and said cam to induce rotatable movement of said valve member by the reciprocating movement of said pistons, and an adjustable stop for limiting the stroke of at least one of said pistons.

7. In a meter, a plurality of measuring cylinders having their axis parallel to and spaced around a central axis, there being a port in the wall of each cylinder, reciprocable pistons within said cylinders, separate intake and discharge chambers at the opposite ends of said cylinders, a rotatable hollow member arranged parallel to said cylinders in axial alinement with said central axis having intake and discharge passages open to said chambers and adapted to register successively with said ports in the cylinder walls, and means for translating the reciprocable movements of said pistons to a rotatable movement and for transmitting said rotatable movement to said rotatable hollow member.

In testimony whereof I affix my signature.

JOSEPH F. JAWOROWSKI.